Patented May 1, 1928.

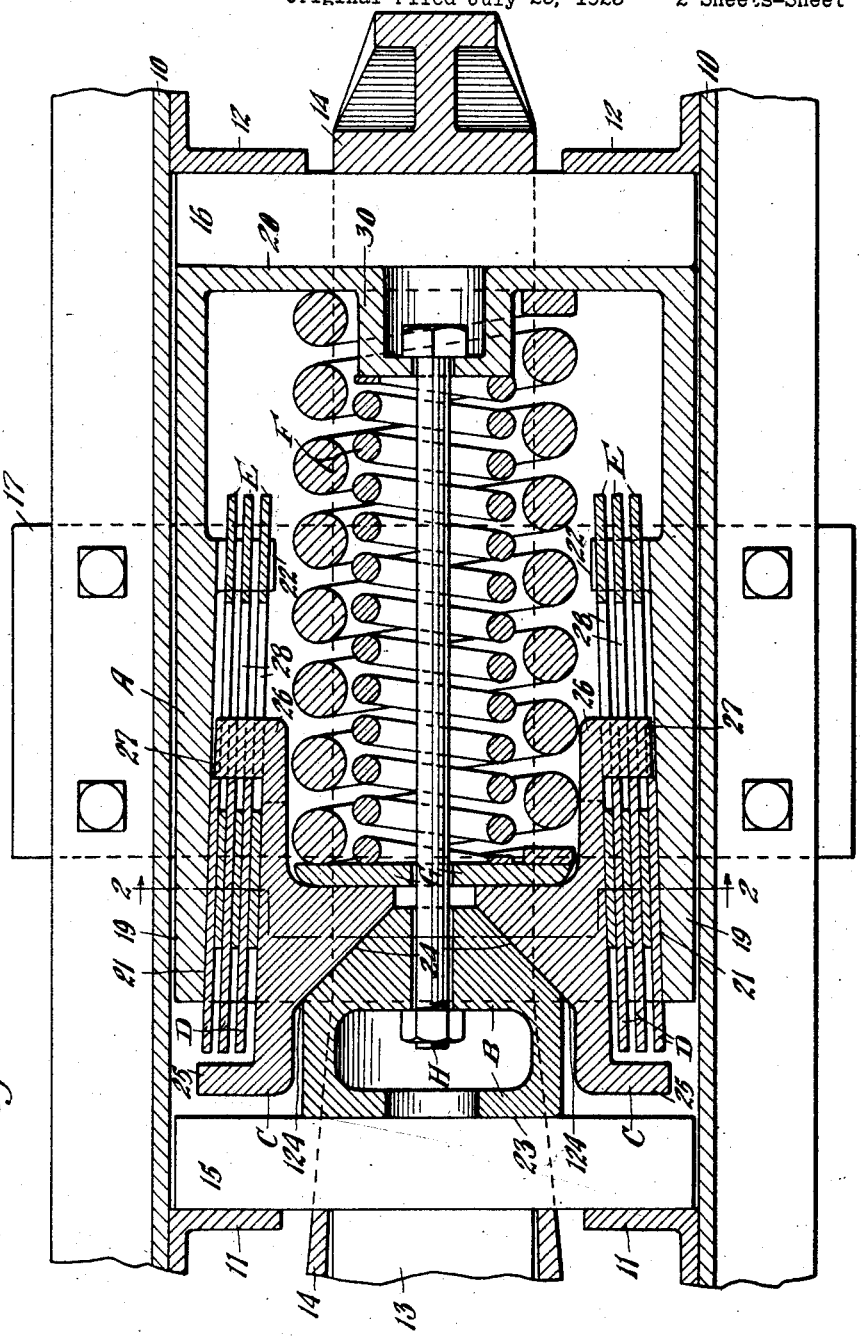

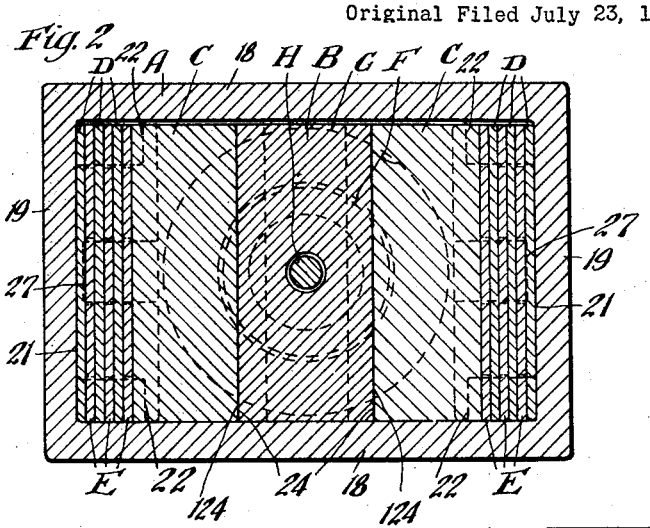
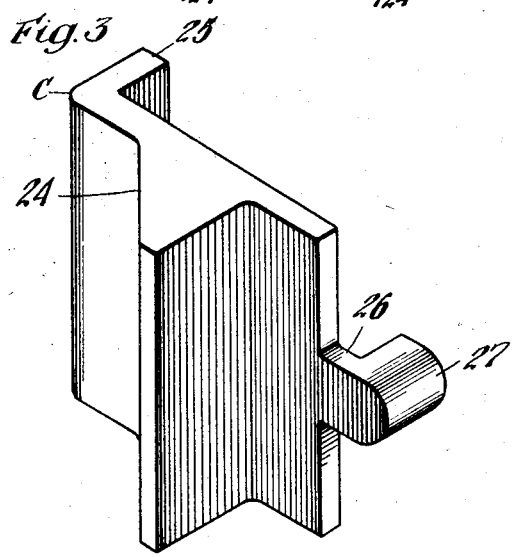
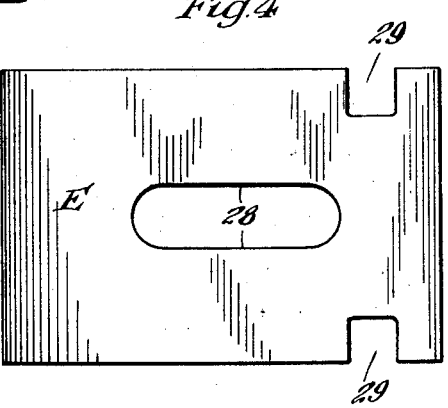

1,667,798

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Original application filed July 23, 1923, Serial No. 653,114. Divided and this application filed February 15, 1926. Serial No. 88,192.

This application is a division of my copending application Serial No. 653,114, for friction shock absorbing mechanisms, filed July 23, 1923, on which Patent No. 1,586,322 was granted May 25, 1926.

One object of the invention is to provide a friction shock absorbing mechanism, more particularly adapted for railway draft riggings, including a friction system comprising wedge friction shoes and wedge means co-operating therewith and relatively movable friction elements, wherein the actuating forces for moving said elements relatively is transmitted through the friction shoes.

Another object of the invention is to provide a friction shock absorbing mechanism of the type referred to wherein a graduated action in both compression and release is obtained by producing a preliminary action of the wedge and friction shoes prior to engagement of the movable friction elements by the shoes.

Other objects and advantages of the invention will more fully and clearly appear from the description and claims hereinafter following.

In the drawings, forming a part of this specification, Figure 1 is a horizontal, longitudinal, sectional view of a portion of a railway draft rigging showing my improvements in connection therewith. Figure 2 is a vertical, transverse, sectional view corresponding substantially to the line 2—2 of Figure 1. Figure 3 is a detailed, perspective view of one of the friction shoes. And Figure 4 is a side elevational view of one of the fixed friction elements employed in connection with my improved mechanism.

In said drawings, 10—10 denote channel-shaped center or draft sills of a railway car underframe, to the inner surfaces of which are secured front stop lugs 11—11 and rear stop lugs 12—12. The inner end portion of the drawbar is designated by 13, the same being operatively connected with a hooded yoke 14 within which is disposed the shock absorbing mechanism proper, a front follower 15 and a rear follower 16. The yoke and the parts therewithin are supported in operative position by a detachable saddle plate 17 fixed to the draft sills.

The improved shock absorbing mechanism proper, as shown, comprises, broadly, a combined friction shell and spring cage casting A; a central wedge B; a pair of wedge friction shoes C—C; two sets of movable friction plates D—D; two sets of relatively stationary friction plates E—E; a spring resistance element F; a spring follower G; and a retainer bolt H.

The casting A which is of generally rectangular form is provided at its front end with a friction shell proper and rearwardly thereof with the spring cage section. The casing has horizontally disposed, spaced, top and bottom walls 18—18, vertically disposed, spaced, side walls 19—19, and a transverse rear end wall 20. The end wall 20 bears directly on the rear follower 16 which in turn co-operates with the stop lugs 12. The side walls 19 are provided with longitudinally disposed flat interior friction surfaces 21—21, the surfaces 21 converging slightly rearwardly of the mechanism. At the rear end of each of the friction surfaces 21, the side walls 19 of the casing are provided with pairs of inwardly projecting lugs 22—22, each pair of lugs being spaced apart vertically as most clearly shown in Figure 2.

The central wedge B is in the form of a hollow block having a flat front end face 23 bearing directly on the inner surface of the front follower 15. At the inner end, the wedge block B is provided with a pair of rearwardly converging flat wedge faces 24 adapted to co-operate respectively with the two friction shoes C.

The friction shoes C are of like construction and are arranged on opposite sides of the wedge B. Each friction shoe C is in the form of an elongated block having a lateral enlargement on the inner side thereof provided with a front wedge face 124 correspondingly inclined to and adapted to co-operate with the wedge face 24 at the same side of the wedge B. At the front end, each shoe C has a lateral flange 25 adapted to co-operate with the movable plates as hereinafter more fully described. At the rear end, each shoe C has an extension 26 provided with a lateral, outwardly extending lug 27 adapted to co-operate with the rear ends of the movable friction plates D.

The friction plates D and E are disposed within the friction shell and comprise two oppositely arranged groups. As herein shown, the groups of plates each comprise three plates D and three plates E, the plates D and E being alternated with one of the plates D of each group disposed outermost and co-operating with the corresponding friction surface 21 of the casing A. One of the plates E of each group is disposed innermost and co-operates with the corresponding friction shoe, each of the shoes being provided with an outer flat friction surface bearing on the innermost plates E of the two groups. The plates D are all of like construction and as most clearly shown in Figure 1 are of substantially rectangular outline and of a length less than the distance between the flange 24 and the lug 21 of the corresponding friction shoes. The plates E are also of like design and as best shown in Figure 4, each plate E is of substantially rectangular outline. The plates E are longer than the plates D and each of the same is longitudinally slotted at the center as indicated at 28 to accommodate the corresponding lug 27 of the friction wedge shoe at the same side of the mechanism. The slots 28 are of such a length as to permit the proper amount of movement of the friction shoes during compression of the mechanism. Each plate E is notched at the top and bottom edges thereof as indicated at 29—29. The notches 29 are disposed closely adjacent the rear end of the plate and are adapted to receive the lugs 22 at the same side of the mechanism. The plates E of each group are thus anchored to the casing A against longitudinal movement, but are adapted to have a certain amount of lateral movement.

The spring resistance element F comprises a relatively heavy outer coil and a lighter inner coil, the outer coil having its opposite ends abutting respectively the rear wall 20 of the casing A and the spring follower G. The rear end of the outer coil of the spring is centered by an inwardly projecting hollow boss 30 on the rear wall 20 of the casing. The inner coil of the spring resistance has its opposite ends abutting respectively the spring follower G and the boss 30. As shown, the spring follower is interposed between the main spring resistance F and bears on the inner ends of the enlargements of the friction shoes C.

The shock absorbing mechanism is held in assembled relation and under initial compression by the retainer bolt H passing through the inner coil of the spring resistance and aligned openings of the wedge block B, spring follower plate G and the boss 30, having its opposite ends anchored in the wedge B and the boss 30 respectively.

The normal position of the parts is that shown in Figure 1, wherein the movable friction plates D have their front ends spaced slightly from the flanges 25 of the shoes C and their rear ends bearing on the lugs 27 of the shoes. The flanges 25 of the shoes C are spaced a sufficient distance from the rear surface of the front follower 15 so that when the mechanism is fully compressed, there will still be clearance between the follower and the flanges of the shoes.

The operation of the improved shock absorbing mechanism is as follows, assuming an inward or buffing movement of the drawbar: Upon inward movement of the drawbar, the follower 15 will be forced rearwardly, thereby moving the wedge B inwardly of the casing A and setting up a wedging action between the wedge and the friction shoes C. Due to the spreading action of the wedge, the friction shoes will be forced against the two groups of friction plates, pressing the same into intimate contact. During the initial compression of the mechanism, there will be no movement of the movable friction plates with reference to the plates E, but the friction shoes will be carried inwardly of the stationary plates, friction being created between the coacting surfaces of the shoes and the innermost plates of the two groups. This action will continue until the flanges 25 of the friction shoes engage the front ends of the movable plates D, whereupon the plates D will be forced to move inwardly in unison with the shoes and relatively to the stationary plates E. During the action just described, the resistance will be greatly augmented due to the friction created between the intercalated plates. During the initial action hereinbefore described, as the shoes are moved inwardly relatively to the plates D, the lugs 27 of the shoes will move away from the inner ends of the plates D, thereby providing a certain amount of clearance which is maintained during the entire compression stroke and is available when the gear is released to permit the shoes to move outwardly a limited distance with reference to the plates D before the plates are actually engaged by the lugs 27 to restore them to normal position. The compression of the mechanism continues either until the actuating force is reduced or until the front follower engages the front end of the casing A. Upon engagement of the casing A by the follower 15, the actuating force will be transmitted directly through the casing to the rear follower and the rear stop lugs, the casing acting as a solid column to transmit the load, thus relieving the spring resistance from excessive compression.

When the actuating force is reduced, the expansive action of the main spring resistance F will force the friction shoes and wedge B outwardly. Inasmuch as clearance is provided between the lugs 27 and the inner ends of the movable plates D during compression of the mechanism, the wedge block and the friction shoes will be forced outwardly independently of the plates D during the initial releasing action, thereby greatly facilitating this operation. As the shoes are moved outwardly, the lugs 27 will pick up the plates D and return them to the position shown in Figure 1. Outward movement of the wedge D is limited by the retainer bolt and the shoes have their outward movement limited by their contact with the wedge members.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a column load sustaining member; of a plurality of friction elements, certain of said elements being fixed against longitudinal movement with reference to said member, and the remaining elements being movable longitudinally of said member; a wedge friction system co-operating with said elements, said system including a wedge member and friction shoes; means on said shoes co-operating with the front and rear ends respectively of said movable element for effecting longitudinal movement thereof inwardly and outwardly with reference to said member; and a spring resistance opposing movement of said shoes.

2. In a friction shock absorbing mechanism, the combination with a friction member; of a plurality of friction elements co-operating with said member, certain of said elements being fixed against longitudinal movement with reference to said member and the remaining elements being movable longitudinally of said member; lateral pressure transmitting means movable longitudinally of said member, said means including friction shoes; means on said shoes normally spaced from the outer ends of said movable elements and engageable with said last named elements for actuating the same after a predetermined compression of the mechanism; and spring means co-operating with said spreading means.

3. In a friction shock absorbing mechanism, the combination with a friction shell; of a plurality of friction plates within the shell, certain of said plates being fixed against longitudinal movement and the remaining plates being movable relatively to said first named plates; wedge pressure creating means co-operating with said plates, said means including a main wedge and a pair of friction shoes, said shoes having means at the front and rear ends thereof co-operating with the opposite ends of said movable plates for effecting movement of the same, said means being spaced apart a distance greater than the length of said movable plates; and spring resistance means opposing movement of said shoes.

In witness that I claim the foregoing I have hereunto subscribed my name this 10th day of February 1926.

JOHN F. O'CONNOR.